United States Patent [19]
Bode et al.
[11] Patent Number: 4,786,835
[45] Date of Patent: Nov. 22, 1988

[54] COMMUTATOR WINDING END SUPPORTS FOR ELECTRIC MACHINES

[75] Inventors: Werner Bode; Peter Franz, both of Hildesheim, Fed. Rep. of Germany

[73] Assignee: Robert Bosch GmbH, Stuttgart, Fed. Rep. of Germany

[21] Appl. No.: 45,130

[22] PCT Filed: Jul. 7, 1986

[86] PCT No.: PCT/DE86/00280

§ 371 Date: Apr. 28, 1987

§ 102(e) Date: Apr. 28, 1987

[87] PCT Pub. No.: WO87/01521

PCT Pub. Date: Mar. 12, 1987

[30] Foreign Application Priority Data

Aug. 28, 1985 [DE] Fed. Rep. of Germany ....... 3530652

[51] Int. Cl.[4] .............................................. H02K 13/04
[52] U.S. Cl. ....................................... 310/233; 310/71
[58] Field of Search ............... 310/233, 234, 235, 236, 310/42, 43, 71; 29/597

[56] References Cited

U.S. PATENT DOCUMENTS 550,407 11/1895 Dice .................................. 310/233
1,406,448 2/1922 Doman ............................... 310/233
1,816,629 7/1931 Wörner .............................. 310/235
3,192,424 6/1965 Jones .................................. 310/236
3,193,714 7/1965 Hoven ................................. 310/236
3,251,120 5/1966 Reisnecker .......................... 310/235
4,376,254 3/1983 Hellmann ............................ 310/235
4,437,030 3/1984 Coquillart ........................... 310/227
4,559,464 12/1985 Stokes ............................... 310/233
4,638,202 1/1987 Ebner .................................. 310/42

FOREIGN PATENT DOCUMENTS 526466 6/1931 Fed. Rep. of Germany ...... 310/236
1525972 9/1978 United Kingdom ................ 310/236

*Primary Examiner*—Patrick R. Salce
*Assistant Examiner*—D. L. Rebsch
*Attorney, Agent, or Firm*—Walter Ottesen

[57] ABSTRACT

A commutator for electric machines has a multiplicity of segments (2), which are provided with anchoring means (5) for securing in the insulating body (13), are joined at one end with associated winding ends (8) of a rotor, and are divided from one another in the circumferential direction by slots (10) which are filled with insulating material (15). The insulating material forming the insulating body (13) and filling the slots (10) as insulating lamellas (15) protrudes radially, in the form of widened supports (16), beyond the insulating lamellas (15). The supports (16) form the boundary in the circumferential direction for the terminal grooves (17) of the segments (2) for the rotor winding ends (8), which are welded to the segments (2).

13 Claims, 2 Drawing Sheets

COMMUTATOR WINDING END SUPPORTS FOR ELECTRIC MACHINES

STATE OF THE ART

The invention is based on a commutator for electric machines. Commutators of this type typically have relatively wide slots between the segments and require terminal lugs on the segments, in which the winding ends are received laterally, that is, in the circumferential direction of the commutator, in a reliably guided manner, for instance being welded to the segments.

The terminal lugs are also required for receiving and supporting a binding for the armature end windings to increase the resistance to centrifugal force.

These known commutators can still be manufactured relatively economically by extrusion, but a disadvantage is that this can be done only as long as the volume of the material—preferably copper—is distributed substantially uniformly over the entire length of the segments, including the terminal lugs, and above all as long as the slot width does not fall below a predetermined minimum value.

The known commutators can also be manufactured as rolled commutators. Rolled commutators can be manufactured substantially more economically than corresponding extruded versions. Also, the slots between the segments can be embodied more narrowly here. However, in rolled commutators, the segments of which are produced from a copper strip having the profile of the segment cross section, it is a disadvantage that the terminal lugs cannot be integrally connected with sufficient length to reliably secure the winding ends to them and to receive the binding for the armature end windings. The terminal lugs are therefore secured as separately manufactured parts to the segments. This makes the manufacture of rolled commutators also expensive.

OBJECT, ATTAINMENT AND ADVANTAGES OF THE INVENTION

The invention accordingly has the object of providing an economical commutator for electric machines, which is provided with relatively narrow insulating slots between the segments and with long terminal lugs, which do not hinder the reliable binding of the winding ends to the segments, and in which the existing volume of the material making up the segments is disposed to an increased extent in the area of the brush running surface, to reinforce the resistance to centrifugal force and/or to increase the thermal storage capacity.

For attaining this object, the provisions disclosed in the characterizing portion of the main claim are provided.

An advantage is that the part of the segments that forms the terminal lugs for receiving the winding ends is at least partly made of an insulating material, so that the commutator, for instance as a rolled commutator or as a ring-armored molded commutator, can be economically embodied with narrow slots between the segments and with maximally short terminal lugs. The widened webs of insulating material assume the functions of the terminal lugs, such as receiving the winding ends and fixing the winding ends in the securing position and while they are being secured to the segments.

Advantageous further developments of the commutator disclosed in the main claim are possible by means of the provisions recited in the dependent claims. A particular advantage is the increased resistance to centrifugal force of the commutator, because the segments have less copper, and thus less of the heavier material composition, in the terminal region of the winding ends. A further advantage is that the widened webs can also perform the support function for the binding for the end windings to be mounted later. The widened webs of insulating material are also suitable as extensions of the terminal lugs in extruded commutators, with a slot width that can still be produced in an economical manner. Examples of suitable insulating material that is advantageously capable of assuming so many functions in the commutator include phenol resin, melamine phenol or epoxy resin molding materials, which may also be reinforced with fiber materials. Melamine phenol molding materials are suitable because of their adhesive action with copper, particularly in extruded commutators having relatively small anchoring means as additional retention means for the segments. In the insulating materials mentioned, the winding ends can be reliably secured to the segments by welding, again in an advantageous manner. Suitable methods for this purpose include resistance welding, diffusion welding and ultrasonic welding, for example.

DRAWING

Exemplary embodiments of the invention are shown in the drawings and described in further detail in the ensuing description. Shown are:

FIG. 1, a rolled commutator, partially in longitudinal section;

FIG. 2, a cross section taken along the line II—II of FIG. 3 through a portion of the commutator having the winding ends and the binding for the armature end windings;

FIG. 3, the commutator in section taken along the line III—III of FIG. 2; and FIG. 4, an extruded commutator and FIG. 5, a ring-armored commutator, each seen in a partial longitudinal section.

DESCRIPTION OF THE EXEMPLARY EMBODIMENTS

Figure 1:
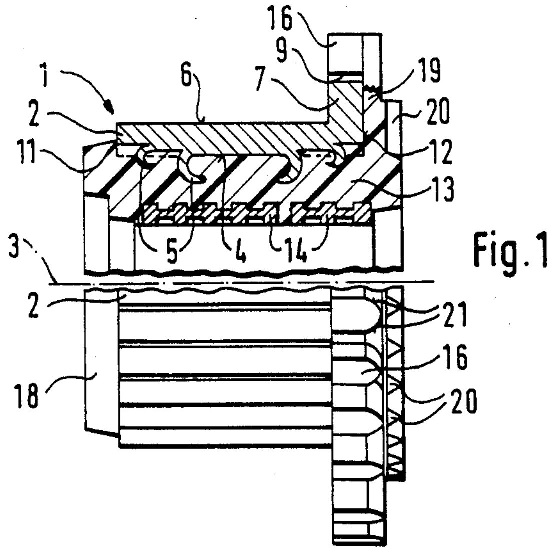
Figure 2:
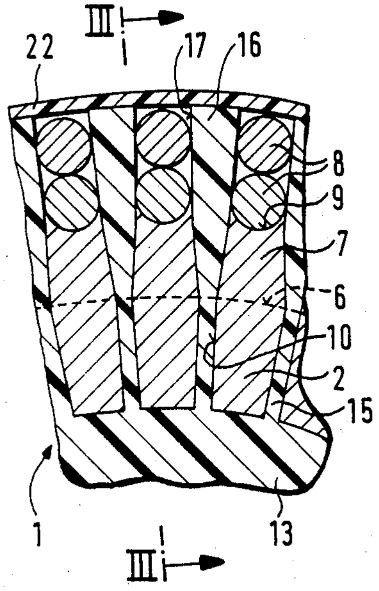
Figure 3:
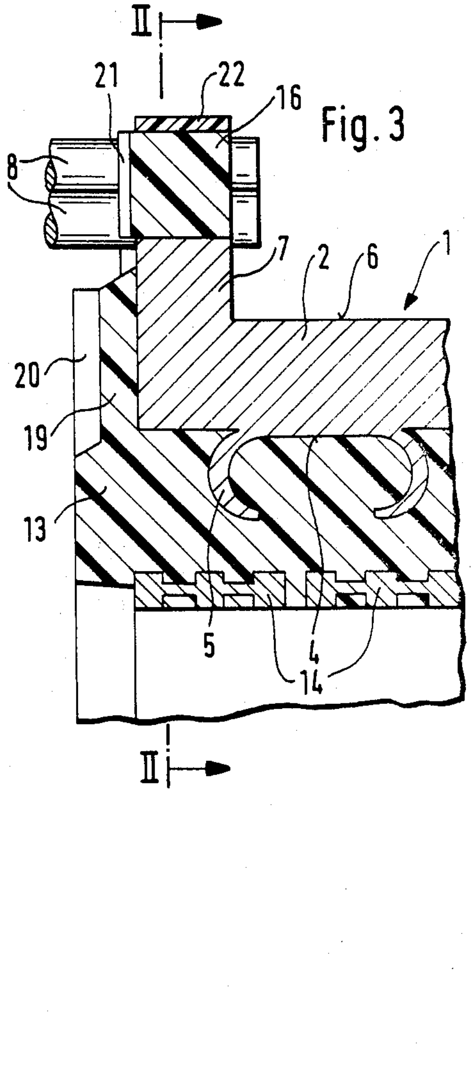

A commutator 1—shown in FIGS. 1–3 as a rolled commutator—has a multiplicity of segments 2, which are provided on their side 4 oriented toward the longitudinal axis 3 of the commutator 1 with anchoring means 5 in the form of claws. The segments 2 have a short collar 7 on one end that protrudes radially with respect to the longitudinal axis 3 of the commutator past their running surface 6. The collar 7 serves as a terminal lug for associated winding ends 8 of a rotor winding, known per se and not shown in further detail. In the exemplary embodiment shown in the drawing, two winding ends 8 of round cross section are secured one above the other on each segment 2. The terminal side 9 of the collar 7, to this end, is recessed in accordance with the shape of the winding ends 8. As a result, a bearing surface for the winding ends having the largest possible surface area is formed on the particular terminal side 9. The winding ends may also have an oval or rectangular cross section and they may also be disposed one beside the other. The terminal side 9 is then also embodied in accordance with the shape of the winding ends. The commutator 1 may also be modified such that the segments 2, instead of having the collar 7, are provided with the terminal side 9 directly on the end of the running surface 6.

In the case of the rolled commutator, the segments 2 are formed from a profile strip of copper. To this end, grooves extending transversely across the profile strip are molded into the profile strip in a manner known per se and not shown in further detail, in accordance with the intended commutator spacing; these grooves later, as segment dividing grooves 10, divide the segments 2 from one another. The segments 2 are still joined, after the forming of the grooves—as known per se—by narrow webs on the running surface 6 which span the segment dividing grooves 10, so that the profile strip can be rolled into a segment ring. Even before the rolling, or afterward, the anchoring means 5 can be shaved or pared in one or several stages from the end faces 11 and 12 in the longitudinal direction of the segments 2.

An insulating material is introduced into the segment ring. The insulating material is embodied as an insulating body 13, in which both the segments 2 and a bearing bush 14 are anchored, the commutator being supported with this bearing bush on a rotor shaft which again is known per se and not shown in further detail. The insulating material also fills the segment dividing grooves 10 completely and thus forms the insulating lamellas 15 between the segments 2 along with the collar 7. Finally, the insulating lamellas 15, which widen in wedge fashion in the collar 7, merge with wider supports 16 radially adjoining them, which protrude radially beyond the collar 7. The supports 16 serve as a means of lateral guidance of the winding ends 8 that are to be secured to the segments 2. They represent the boundary of terminal grooves 17 for the winding ends 8 in the circumferential direction. The insulating body 13 also has flanges 18 and 19 surrounding the inner edge section of the end faces 11 and 12, these flanges acting as reinforcing retaining means for the segments 2 in the insulating body 13. The flange 19 is also provided with axially protruding and radially extending ribs 20 of triangular cross section, the center line of each of which is in alignment with a respective one of the lamellas 15. The supports 16 also axially protrude at the end face 12 of the segments 2. Their edges 21 are beveled, which facilitates insertion without damage of the winding ends 8 into the terminal grooves 17.

As the insulating material, molding materials such as phenol resin, melamine phenol or epoxy resin molding materials are especially suitable, and they may also be reinforced with fiber materials.

After the introduction of the insulating material into the segment ring, the webs that join the segments 2 are removed, in a manner known per se and not shown in further detail.

The winding ends 8 laid one above the other in the terminal grooves 17 defined in the circumferential direction by the supports 16 are secured mechanically and in an electrically conductive manner by being welded to the bottom of the terminal grooves 17, which is formed by the terminal side 9 of the respective collar 7 or segment end. The insulating material enables brief heating in the immediate vicinity of the supports 16 during the welding process for the parts 7, 8. The supports 16, made of the selected insulating material, also promote the passage of current from a welding electrode placed against the winding ends 8, through the winding ends 8, the collar 7 and the segment 2, to a ground electrode placed on the segment 2, in that they narrow the passage of current through the electrodes into a virtually straight line.

To increase the resistance to centrifugal force, a rotor binding 22 can additionally be slipped as a sleeve over the supports 16, closing off the terminal grooves 17 from the outside.

Figure 4:
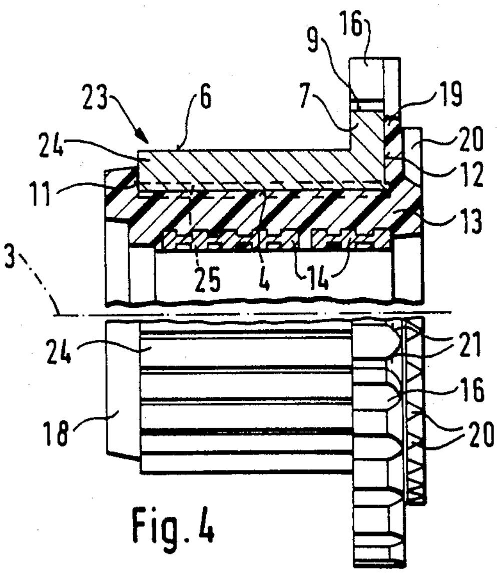

In FIG. 4, an extruded commutator 23 is shown. To the extent that its elements are the same as those of the rolled commutator 1, they are identified by the same reference numerals. The segments 24 are shaped into a segment ring in a manner known per se and not shown in further detail by the extrusion of a blank and are then separated from one another again after the introduction of the insulating material forming the insulating body 13, insulating lamellas 15 and supports 16. The segments 24 now have anchoring means 25, with a dovetailed cross section, which extend over the entire length of the side 4 of the segments 24 oriented toward the longitudinal axis 3.

Figure 5:
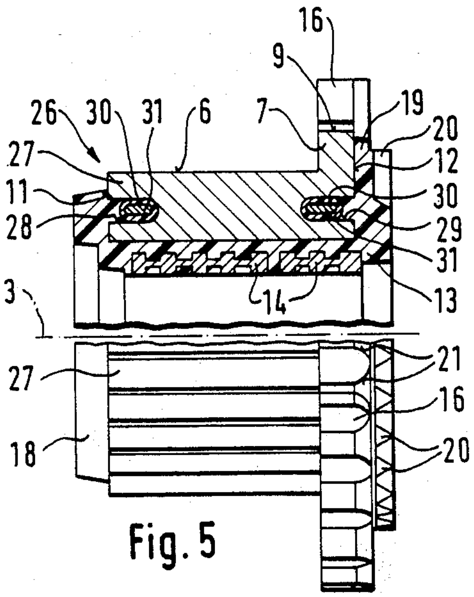

In FIG. 5, a ring-armored commutator 26 is also shown. To the extent that its elements are the same as those of the rolled commutator 1, they are identified by the same reference numerals.

The segments 27 are stamped from a strip of copper and provided at the end faces 11 and 12 with a respective groove 28 or 29. A respective armoring ring 31, surrounded by an insulating sleeve 30, is inserted into each of the grooves 28 and 29, holding the segments 27 together to form a segment ring and simultaneously serving along with the grooves 28 and 29 as an anchoring means for the segments 27 in the insulating body 13.

We claim:

1. A commutator for an electrical machine equipped with a rotor defining a rotational axis, the rotor being provided with electrical winding means having a plurality of winding ends, the commutator defining a longitudinal axis coincident with said rotational axis and having respective longitudinal commutator ends, the commutator comprising:

- a plurality of segments defining a peripheral running surface surrounding said longitudinal axis;
- said segments being disposed in spaced relationship one next to the other so as to cause said segments to conjointly define a plurality of slits;
- each one of said segments having a seat formed thereon so as to extend over the entire lateral width of said segment, said seat being disposed at one of said commutator ends for receiving selected ones of said winding ends thereon;
- an insulating body for accommodating said segments therein and including a first portion filling said slits and a second portion extending radially beyond said running surface at said one commutator end in a non-overlapping relationship to said segments to define a plurality of radially outwardly extending supports one adjacent the other;
- each two mutually adjacent ones of said supports projecting outwardly beyond a corresponding one of the seats of said segments to conjointly define a gap above the seat corresponding to said width of said segment for accommodating selected ones of said winding ends therein;
- said selected ones of said winding ends being electrically and mechanically connected to the seat of the segment corresponding to said gap; and,
- anchoring means on said segments for anchoring the same in said insulating body.

2. The commutator of claim 1, each of said segments having a short connecting projection at said one commutator end extending radially outward beyond said surface to define said seat at the base of said gap and to which said selected ones of said winding ends are connected.

3. The commutator of claim 1, said commutator having an end face at said one commutator end and said supports projecting outwardly from said end face in the direction of said longitudinal axis.

4. The commutator of claim 1, said supports having respective radially outward free ends, the commutator further comprising a sleeve-like circular band concentric with said longitudinal axis and placed over said free ends so as to be in contact engagement therewith.

5. The commutator of claim 1, wherein the segments are combined into a segment ring as stamped parts provided with their circumferential form by means of armoring rings into which segment ring the insulating material is introduced, the insulating material forming the insulating body, filling the slits as insulating lamellas and forming the widened supports.

6. The commutator of claim 1, the insulating body including the portion thereof filling said slits and said supports being made of a phenol resin molding material.

7. The commutator of claim 1, the insulating body including the portion thereof filling said slits and said supports being made of a phenol resin molding material reinforced with fiber materials.

8. The commutator of claim 1, the insulating body including the portion thereof filling said slits and said supports being made of a melamine phenol molding material.

9. The commutator of claim 1, the insulating body including the portion thereof filling said slits and said supports being made of a melamine phenol molding material reinforced with fiber materials.

10. The commutator of claim 1, the insulating body including the portion thereof filling said slits and said supports being made of an epoxy resin molding material.

11. The commutator of claim 1, the insulating body including the portion thereof filling said slits and said supports being made of an epoxy resin molding material reinforced with fiber materials.

12. The commutator of claim 1, wherein the winding ends received and guided between the supports are attached to corresponding ones of said segments by welding.

13. The commutator of claim 1, wherein each of said supports defines an imaginary plane bisecting the support and passing through said longitudinal axis; each of said supports being configured so as to widen above the seat of the corresponding one of said segments and in a direction perpendicular to said plane thereby causing each of said gaps to be substantially uniformly narrow above the seat and provide a snug fit for the winding ends accommodated therein.

* * * * *